United States Patent

Birkin

[15] 3,700,886
[45] Oct. 24, 1972

[54] COMMUNICATION SYSTEMS BETWEEN A TRACKWAY AND VEHICLES

[72] Inventor: Michael Sambrook Birkin, Derby, England

[73] Assignee: British Railways Board, London, England

[22] Filed: Oct. 30, 1970

[21] Appl. No.: 85,317

[30] Foreign Application Priority Data

Nov. 3, 1969 Great Britain..........53,895/69

[52] U.S. Cl. ..........246/63 A, 246/167 R, 340/146.1
[51] Int. Cl. ..............................................B61l 1/08
[58] Field of Search .....246/187 B, 63 A, 63 C, 63 R, 246/167 R, 182 R, 3, 182 B; 340/146.1

[56] References Cited

UNITED STATES PATENTS

| | | | |
|---|---|---|---|
| 3,387,723 | 6/1968 | Lemelson | ..............214/16.4 A |
| 3,334,224 | 8/1967 | Allen et al. | ..........246/182 B X |

*Primary Examiner*—Gerald M. Forlenza
*Assistant Examiner*—George H. Libman
*Attorney*—Sommers and Young

[57] ABSTRACT

A communication system is provided between a trackway and a vehicle running along the trackway, in which information is transmitted between the trackway and the vehicle through an energy coupling such as an inductive coupling between a conductor system laid along the trackway and a pickup aerial on the vehicle. The trackway is divided into sections for each of which respective geographical information is valid for use by a vehicle in that section. An information transmitter is provided on the trackway for transmitting to a vehicle, while it is in a section, geographical information relevant to a section of the trackway ahead. An information store such as a buffer store of a computer is provided on the vehicle for storing the geographical information. Signalling means are provided on the trackway for causing the stored information to be transferred from the storage means to information processing means on the vehicle, i.e., from the buffer store to the main store of the computer when the stored information becomes valid for use.

5 Claims, 4 Drawing Figures

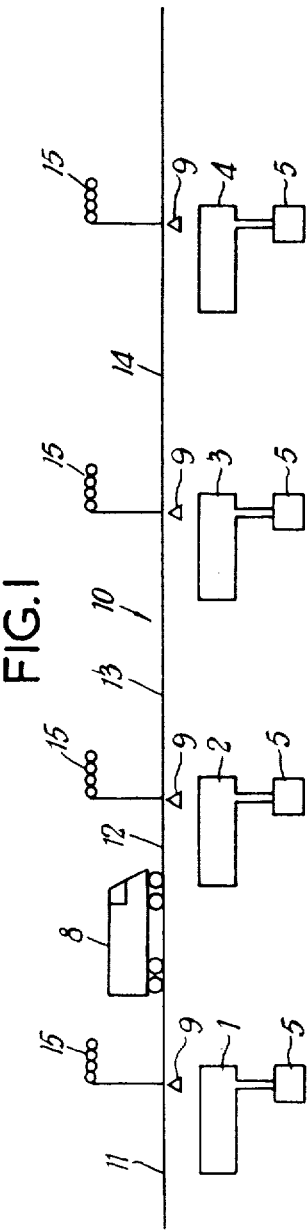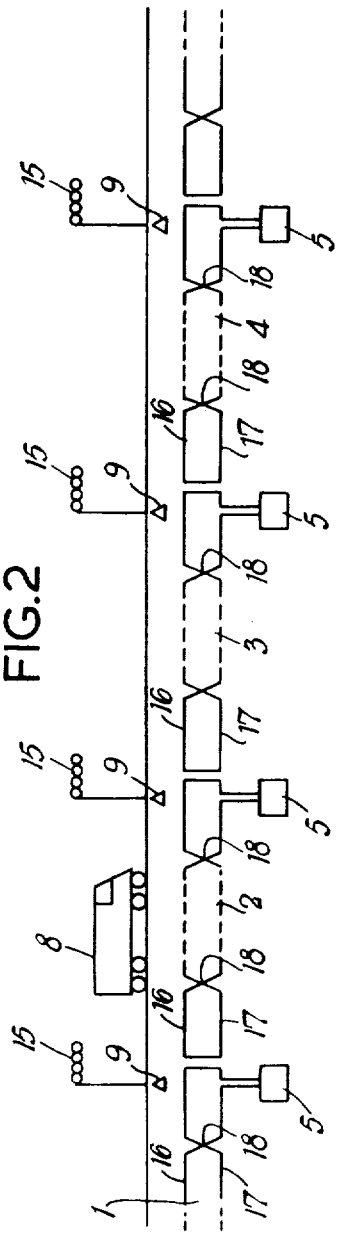

COMMUNICATION SYSTEMS BETWEEN A TRACKWAY AND VEHICLES

BACKGROUND OF THE INVENTION

This invention relates to communication systems between a trackway and vehicles and has particular, but not exclusive, application in railways.

It is necessary in the various stages of the automatic control of vehicle movements where the decision making equipment is situated on the vehicle itself to communicate to the vehicle in question information about the features of the path it is about to take. This information may consist of gradient variations of the path and the positions along the path where the speed of the vehicle is restricted to either junctions and crossings or any other geographic restraint upon the speed of the vehicle. In order to maintain the validity of the information relating to the path of the vehicle is also necessary to advise it of its exact location and the distance travelled since being so advised. Such information will be referred to as "geographical information."

The communication systems with which the invention is concerned are primarily of the kind in which information is transmitted between the trackway and the vehicles through an electromagnetic inductive coupling. However the transmission may use other forms of energy such as radio waves or light.

The object of this invention is to provide a communication system permitting a relatively low data transmission rate between the trackway and the vehicles for the geographic information.

SUMMARY OF THE INVENTION

According to this invention there is provided a communication system between a trackway and a vehicle running along the trackway and in which information is transmitted between the trackway and the vehicle through an energy coupling, the trackway being divided into sections for each of which respective information is valid for use by a vehicle in that section. Information transmitting means are provided on the trackway for transmitting to a vehicle while it is in a section geographical information relevant to a section of the trackway ahead. Information storage means are section, provided on the vehicle for storing the geographical information, and signalling means are provided on the trackway for causing the stored geographical information to be transferred from the storage means to information processing means on the vehicle when the stored geographical information becomes valid for use.

Since there is a delay in the use of the geographical information communicated to the vehicle only a relatively low data transmission rate is required and a vehicle therefore has time between the signalling means, such as beacons or balizes, in which to acquire the relevant information and to discard false information.

When the energy transmission is through an inductive coupling the information containing magnetic field may be produced by a conductor system laid along the trackway. The conductor system may comprise a series of individual conductor loops laid at intervals along the track, or a continuous conductor system in which the conductors are divided into sections.

BRIEF DESCRIPTION OF THE DRAWINGS

In order that the invention may be readily understood, examples of communication systems in accordance with the invention, and as applied to railway operation, will now be described with reference to the accompanying diagrammatic drawings in which:

FIG. 1 shows the use of individual conductor loops laid along the track for transmitting information to a train.

FIG. 2 shows the use of continuous conductors laid along the track for transmitting information to a train.

DESCRIPTION OF THE PREFERRED EMBODIMENTS

Figure 3:
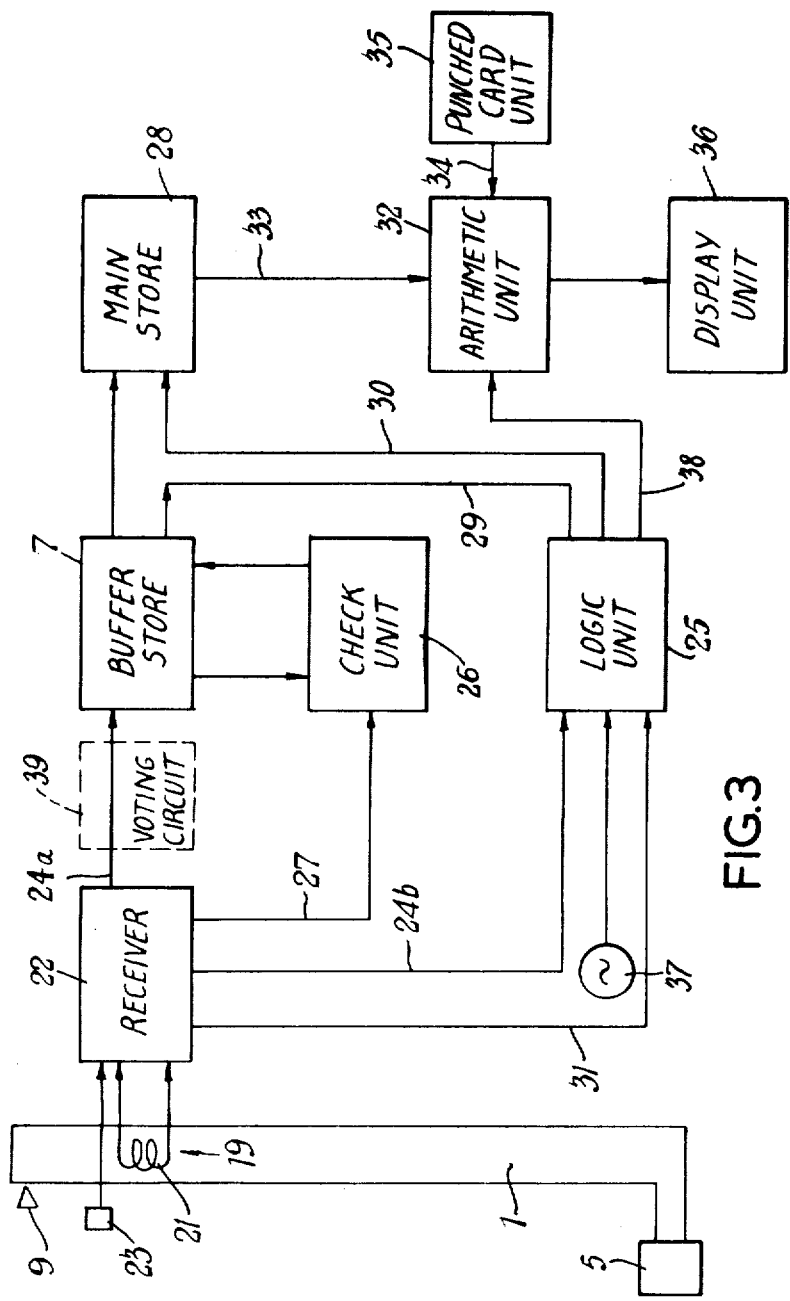
FIG. 3 shows one form of data processing equipment on the train.

Referring to FIG. 1, the track 10 is divided into block sections, 11, 12, 13 and 14, visual signals 15 being provided at the end of each block section. The signals 15 shown are conventional four aspect signals providing the aspects red, yellow, double yellow and green. Adjacent the ends of the block sections conductor loops 1 to 4 are laid along the track. Each of the loops 1 to 4 is energized from a transmitter 5, which feeds into the associated conductor loop a high frequency carrier which is frequency modulated with a continuously repeated digital telegram of geographical information such as gradient and speed restrictions of the next block section ahead. Thus the digital track telegram transmitted to conductor loop 1 will give the geographical information for block section 12. The geographical information may be stored in read-only memories forming part of the transmitter 5. Also transmitted to each conductor loop is a high frequency carrier, frequency modulated in accordance with the prevailing signal aspect of the signal 15 at the end of the associated block section. Thus the signal aspect transmitted into the loop 1 will relate to the signals at the end of block section 11. As will be described the digital telegram received from a conductor loop is stored in a buffer store 7 (FIG. 3) of data processing equipment on the train 8 until the train enters the next block section when a beacon 9 at the transition between two block sections provides a signal to the train informing it that the digital telegram is valid for use.

Since the digital telegram relating to geographical track features is not used immediately but stored in the buffer store 7, time is available at a relatively slow data processing rate for obtaining a valid telegram of geographical information. The signal aspect data transmitted is continuously and immediately processed by the data processing equipment on the train so that changes in signal aspect can be immediately taken into account in controlling the running of the train. Since signal aspect information is short in comparison to the geographical information, there is no problem in receiving signal aspect information, checking it and using it in the same block section in which it is received.

In FIG. 2 is shown a continuous conductor system, that is to say conductors 16 and 17 extend for the whole length of each of the block sections, but similarly to the system of FIG. 1 the conductors 16 and 17 in each block section are formed into a closed loop energized from a respective transmitter 5 with a digital telegram relating to geographical features of the track and with signal aspect data. For convenience the conductor loops have again been referenced 1 to 4. The conductors 16 and 17 have in known manner regularly spaced transposition points 18 which enable the exact position of the train along the track to be checked against the position as indicated by tachometer generator means on the train. With the continuous conductor system an earlier indication of the prevailing signal aspect is given, and a longer time is provided for obtaining a valid telegram of geographical information, than in the system of FIG. 1. Beacons 9 are again provided at the transitions between block sections to provide a signal to the train that a digital telegram stored in the buffer store 7 is valid for use.

Referring now to FIG. 3, this shows the data processing equipment on the train. For convenience the conductor loop 1 is shown and it will be assumed that the train is travelling in the direction of arrow 19 towards the beacon 9 at the end of the block section 11.

Pick-up means on the train in the form of a winding 21 on a ferrite rod becomes inductively coupled with the conductors of loop 1 as the train is moving over the loop to pick up the digital telegram and the signal aspect data and pass this in the form of a frequency modulated carrier corresponding to the output of the transmitter 5 to the train borne receiver 22. Pick up means 23 are also provided on the train for picking up a signal from beacon 9 as it passes over the latter, which signal is also transmitted to the receiver 22. The beacons 9 may be for example permanent magnets.

The receiver 22 amplifies, filters and demodulates the input to it from winding 21 and provides two outputs one comprising the digital telegram relating to geographical track features which is fed via line 24a either directly or optionally via voting circuit 39 to the buffer store 7 and the other comprising signal aspect data which is fed via line 24b to control logic unit 25. The buffer store 7 and control logic unit 25 constitute parts of a train borne computer.

The digital track telegram of geographical information may comprise for example 256 bits each of which is represented in conventional binary notation by '1' or '0' and represented in its input to buffer store 7 as frequency $f_1$ or $f_0$. Of the 256 bits 88 bits may be for synchronization purposes, 16 bits for parity and the remaining 152 bits then comprise the information content of the telegram. The information content may for example include the distances to the four next signals from the point where the telegram becomes valid for use and the average gradients over these distances. It may also include full information about permanent and temporary speed restrictions and the distance to their commencement and other appropriate geographical data. A telegram check unit 26 is provided in conjunction with the buffer store 7. By use of the parity and synchronization bits the telegram is checked in known manner and only after a valid telegram has been received is this accepted and stored in the buffer store 7. Once a valid telegram is acquired the train receiving equipment will not attempt to continue receiving the transmitted telegram.

Figure 4:
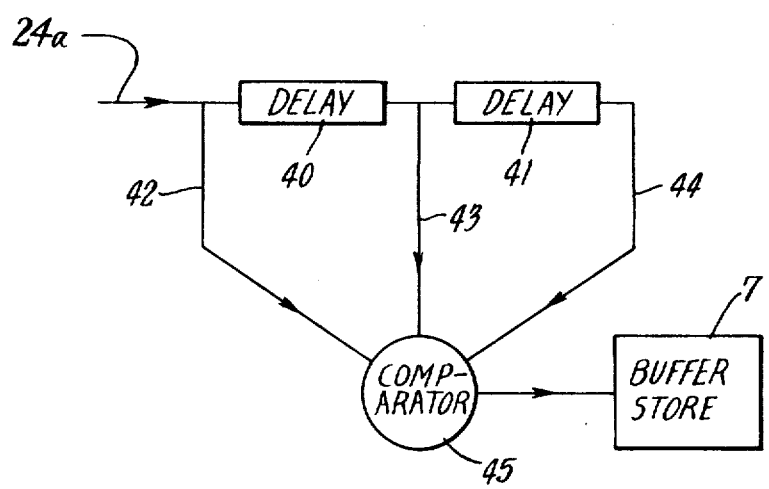
FIG. 4 shows a voting circuit for use as an optional feature in the data processing equipment of FIG. 3.

When voting circuit 39 is incorporated in the data processing equipment of FIG. 3 this may be arranged as shown in FIG. 4 in which the feed line 24a and buffer store 7 have also been shown. As stated previously the digital track telegram of geographical information is continuously repeated. The voting circuit includes two delay units 40 and 41 such that corresponding bit positions in three successive telegrams are transmitted simultaneously via lines 42, 43 and 44 to comparator unit 45. If the three bits check correctly with one another this bit of the telegram is passed to the buffer store. Thus a serial bit by bit checking of the telegram by the voting circuit 39 enables a valid telegram to be acquired in relatively poor signal to noise conditions.

When the pick-up means 23 passes over the beacon 9 indicating that the digital telegram stored in buffer store 7 is valid for use, a signal is passed from pick-up means 23 via the receiver 22, the line 27 and telegram check unit 26 to the buffer store 7 to open the outlets of the buffer store 7 and transfer the stored telegram to the main computer store 28. Through line 29 the control logic unit 25 checks that the buffer store 7 has stored a valid telegram and through line 30 permits the main store 28 to receive the stored telegram.

The control logic unit 25 has an input from tachometer generator means 37 on the train indicating the exact position of the train along the track and compares this with the position indicated by an input from receiver 22 via line 31 derived from the transposition points 18 of the track conductors 16 and 17.

The control logic unit 25 feeds to an arithmetic unit 32 via line 38 information relating to the prevailing signal aspect and the position of the train along the track. The track telegram is also passed from the main store 28 to the arithmetic unit 32 via line 33. The arithmetic unit also receives via line 34 an input from a punched card unit 35 on the train information relating to the train such as type of train, length of train and braking characteristics. From the information fed to it the arithmetic unit 32 produces a vehicle control signal, i.e., unit 32 calculates continuously an instantaneous maximum safe or permissible speed which is provided as a visual display to the train driver on display unit 36. As will be appreciated, the displayed speed will immediately vary to take account of changes in signal aspect. By means not shown the brakes will be automatically applied if the train driver exceeds the maximum permissible speed. Thus a maximum speed signal derived from unit 32 will be compared with a tachometer generator signal indicating actual train speed.

It will be appreciated that the automatic system can be extended to the automatic control of driverless trains, using the vehicle control signal output of unit 32 to control the acceleration and braking of the train.

I claim:

1. A communication system between a trackway and a vehicle running along the trackway and in which information is transmitted between the trackway and the vehicle through an energy coupling, the trackway being divided into sections for each of which respective geographical information is valid for use by a vehicle in that section, comprising information transmitting means on the trackway for transmitting to a vehicle while it is in a section, geographical information relevant to a section of the trackway ahead, said geographical information being transmitted through an inductive coupling between a conductor system extending along the trackway and pick-up means on the vehicle, said conductor system comprising a series of individual conductor loops each laid in a respective section of the trackway and extending adjacent the end of the section containing it, each of said loops being energized from a respective transmitting means, information storage means on the vehicle for storing the geographical information, information processing means on the vehicle for processing at least said geographical information to produce a vehicle control signal, and signalling means on the trackway for causing the stored information to be transferred from said storage means to said information processing means when the stored information becomes valid for use.

2. A communication system as claimed in claim 1, wherein said transmitting means is operable to transmit geographical information relevant to the next section ahead of the vehicle.

3. A communication system between a trackway and a vehicle running along the trackway and in which information is transmitted between the trackway and the vehicle through an energy coupling, the trackway being divided into sections for each of which respective geographical information is valid for use by a vehicle in that section, comprising information transmitting means on the trackway for transmitting to a vehicle, while it is in a section, geographical information relevant to a section of the trackway ahead, said geographical information being transmitted through an inductive coupling between a conductor system extending along the trackway and pick-up means on the vehicle, said conductor system extending along the trackway and being divided into sections each of which corresponds in length to a respective section of the trackway, said information transmitting means being coupled to said conductor system for energizing each section thereof, information storage means on the vehicle for storing the geographical information, information processing means on the vehicle for processing at least said geographical information to produce a vehicle control signal, and signalling means on the trackway for causing the stored information to be transferred from said storage means to said information processing means when the stored information becomes valid for use.

4. A communication system as claimed in claim 3, wherein said information processing means includes a computer on the vehicle, said information storage means comprising a buffer store of said computer, said signalling means being operative to cause the information stored in said buffer store to be transferred to the main computer store.

5. A communication system between a trackway and a vehicle running along the trackway and in which information is transmitted between the trackway and the vehicle, through an energy coupling therebetween, as said vehicle travels along said trackway, the trackway being divided into sections for each of which respective geographic information is valid for use for a vehicle in that section, comprising information transmitting means associated respectively with said trackway sections and operable to transmit to a vehicle, while it travels in each section, geographical information relevant to a section of the trackway ahead and further information relevant to the section in which the vehicle is then travelling, receiving means on the vehicle for receiving the geographical and further information transmitted thereto, information storage means on the vehicle for temporarily storing geographical information fed thereto from said receiving means, information processing means on said vehicle coupled to said receiving means and to said storage means, signalling means on the trackway for causing the stored geographical information to be transferred out of said information storage means to said information processing means when the stored information becomes valid for use, said information processing means being jointly responsive to at least the geographical information transferred thereto from said information storage means and to said further information fed thereto from said receiving means for producing a vehicle control signal.

* * * * *